UNITED STATES PATENT OFFICE.

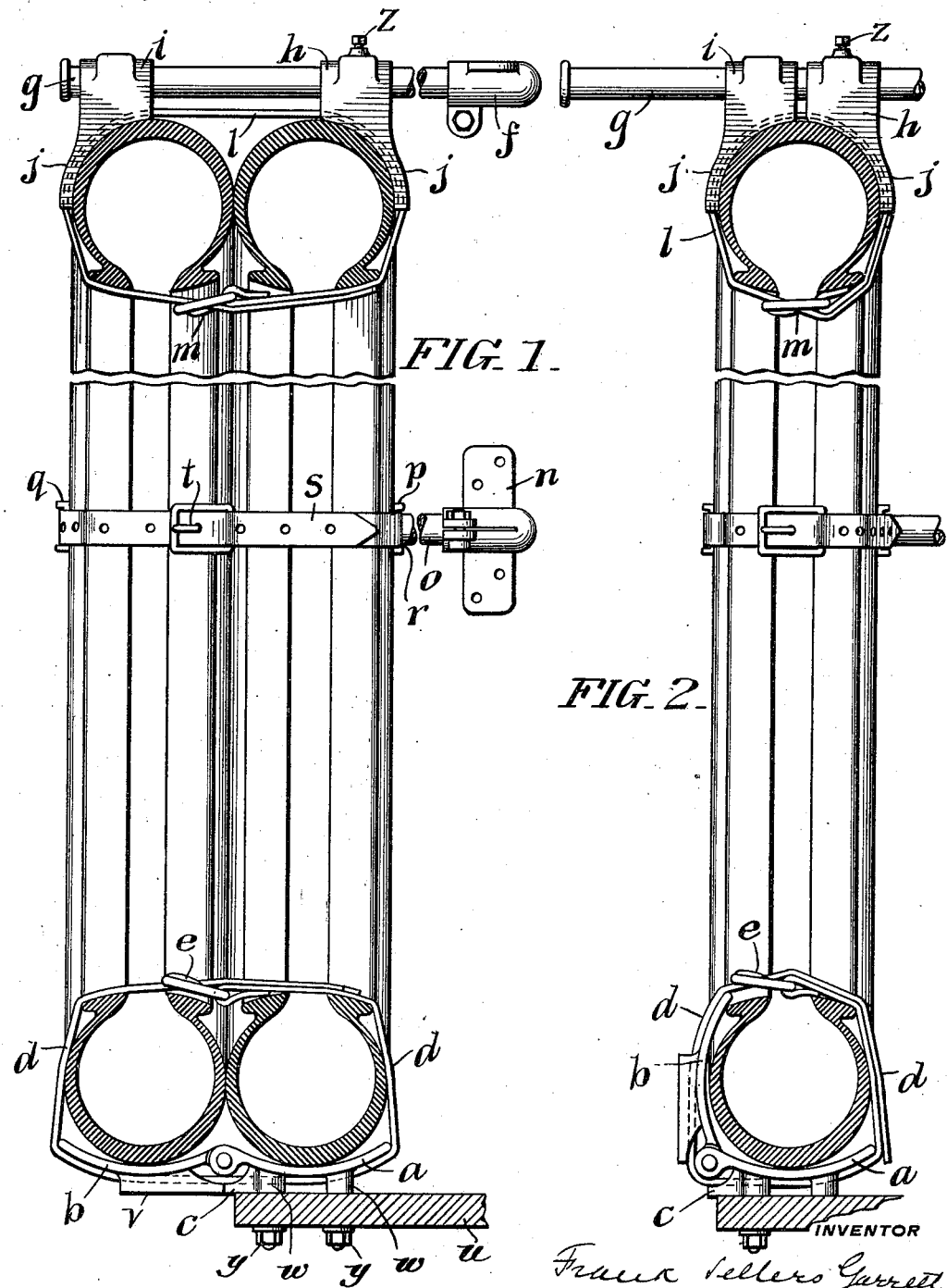

FRANK SELLERS GARRETT, OF WILMINGTON, DELAWARE, ASSIGNOR TO HIMSELF AND HENRY KEPPELE MILLER, OF WILMINGTON, DELAWARE, TRADING AS GARRETT, MILLER & CO.

TIRE-HOLDER.

1,000,508.  Specification of Letters Patent.  Patented Aug. 15, 1911.

Application filed April 19, 1910.  Serial No. 556,376.

*To all whom it may concern:*

Be it known that I, FRANK SELLERS GARRETT, a citizen of the United States, residing at Wilmington, county of Newcastle, and State of Delaware, have invented a new and useful Improvement in Tire-Holders, of which the following is a full, clear, and exact description, reference being had to the accompanying drawings, which form a part of this specification.

My invention relates to certain improvements in tire holders whereby the device is readily adapted for the support of a plurality of tires or a single tire, and further, the device is so arranged that the securing straps, together with the support and guide bracket, extend around the tires in a manner to better secure the tires in position.

Specifically speaking, I provide base supports for the tires, hinged together so that one may be folded upon the other when a single tire alone is carried. Further, with respect to the top and side guides, they consist of brackets which are adjustable with respect to each other so that they may be brought closer or farther from each other to accommodate either a single or a plurality of tires. The guiding or supporting surfaces of these brackets are made curved so as to adapt themselves to the curvature of the tire, and finally, are made tubular so that a single strap may be supported from the tubular portion and secured together around the tire.

Particularly my invention resides in the construction for introducing the straps, and the tubular support for the tire guides, the two section tire guides and the relative movement of these two portions or sections of the tire guides to adapt themselves to a single or plurality of tires.

I will now describe the embodiment of my invention illustrated in the accompanying drawings, in which—

Figure 1 is a section through my device showing two tires being carried. Fig. 2 is a view similar to Fig. 1, but only one tire being carried.

$a$ and $b$ are the base tire guides which are curved.

$w$ are lugs secured to the guide $a$.

$y$ are bolts which pass through the running board $u$ and are secured in the threaded portion of the lugs $w$.

$c$ is a projection also secured to the guide $a$. A portion of this projection $c$ overhangs or passes beyond the end of the running board, as shown.

$v$ is a projection secured to the guide $b$ and which, when the guide $b$ is in the position shown in Fig. 1, contacts with the overhanging or projecting portion of the projection $c$ to support the guide $d$.

The projections $v$ and $c$ have an orifice to allow the passage of a strap therethrough, which strap underlies the guides $a$ and $b$.

The guide $b$ is hinged to the guide $a$. As may be seen, the guide $a$ is immovable, but the guide $b$ can swing upon its pivot connection with the guide $b$, as shown in Fig. 2. This movement is for the purpose of changing the device from a double tire to a single tire holder. Furthermore, as may be seen, it can be readily done by simply tightening up the strap. The top guides comprise the curved clamping sections $j$, $j$, one having an orificed projection $h$, the other an orificed projection $i$, through which orificed projections pass the rod $g$, which rod $g$ is secured to the car body by the bracket $f$. The orificed projection $h$ may be secured to the rod $g$ by means of the set screw $z$. The clamping sections $i$ and $j$ have a curved orifice therethrough concentric with the clamping face, and a strap $l$ passes through this orifice and around the tire or tires and is secured together at its free ends $m$. As may be seen, the tightening of the strap will cause the clamping sections to clamp upon the tires and hold them in position, bringing an even strain on the surface of the tire. There is also provided an unobstructed and free passage for the strap, enabling it to act readily to clamp the tires in position when pulled together at its ends, and thus put an even strain upon each clamping section.

The side guides are secured in the following manner: The bracket $n$ of the side guides may be secured to the dash board, as shown, from which bracket projects the rod $o$ to which one member $p$ of the side guides is fixedly secured by means of the set screw $x$, and the other member is loosely mounted upon the rod $o$ so as to move longitudinally of the rod. Sections $p$ and $q$ have clamping surfaces similar to the top guide sections before mentioned, and have curved orifices r through them, similar to the orifices in the top guides, and through which orifices pass the single strap s, the free ends of which single strap may be secured together around the tire, as shown at t. It has the like advantages of the top guides.

I do not herein claim specifically, in a tire holder, a two section guide, a rod upon which one section is loosely mounted, and means to fixedly secure the other section to the rod, as the same is claimed in an application filed by me August 6, 1910, Serial No. 575,913, a division of this application.

Having now fully described my invention, what I claim and desire to protect by Letters Patent is:—

1. In a tire holder, in combination, two guides, each having a curved clamping section of the shape of the opposite sides of the tire, there being an orifice through each clamping section, and a single strap passing through both orifices for surrounding the tire.

2. In a tire holder, in combination, a base guide or support, for a plurality of tires or a single tire, formed in two sections, means to maintain one section in a substantially horizontal position, a pivotal support for the other section upon which said section is adapted to swing from a horizontal to a vertical position, and a strap underlying said sections and adapted to surround the tire or tires.

3. In a tire holder, in combination a base guide or support, for a plurality of tires or a single tire, formed in two sections, each section being curved, means to maintain one section in a substantially horizontal position, a pivotal support for the other section upon which said section is adapted to swing from a horizontal to a vertical position, and a strap underlying said sections and adapted to surround the tire or tires.

4. In a tire holder, in combination, a base guide or support, for a plurality of tires or a single tire, formed in two sections, a support adapted to maintain one section in a substantially horizontal position, a pivotal support for the other section upon which said section is adapted to swing from a horizontal to a vertical position, there being an orifice through said supports, and a strap passing through said orifices and adapted to surround the tire or tires.

In testimony of which invention, I have hereunto set my hand, at Wilmington, on this 15th day of April, 1910.

FRANK SELLERS GARRETT.

Witnesses:
WILLIAM H. GIBBONS,
EMMETT S. HICKMAN.